US012433817B1

(12) United States Patent
Liu et al.

(10) Patent No.: US 12,433,817 B1
(45) Date of Patent: Oct. 7, 2025

(54) SEXUAL STIMULATION DEVICE

(71) Applicant: HYTTO PTE. LTD., Singapore (SG)

(72) Inventors: Dan Liu, Singapore (SG); Jilin Qiu, Singapore (SG)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/629,191

(22) Filed: Apr. 8, 2024

(51) Int. Cl.
*A61H 23/02* (2006.01)
*A61H 9/00* (2006.01)
*A61H 19/00* (2006.01)

(52) U.S. Cl.
CPC ........... *A61H 19/32* (2013.01); *A61H 9/0092* (2013.01); *A61H 23/02* (2013.01); *A61H 2201/5007* (2013.01); *A61H 2201/5056* (2013.01)

(58) Field of Classification Search
CPC ...... A61H 19/32; A61H 19/30; A61H 9/0092; A61H 9/005; A61H 9/0078; A61H 19/00; A61H 7/00; A61H 7/003; A61H 23/04; A61H 23/02; A61H 2201/1207; A61H 2201/5056; A61H 2201/5007
See application file for complete search history.

(56) References Cited

U.S. PATENT DOCUMENTS 6,142,929 A * 11/2000 Padgett .............. A61H 23/0254
600/38
7,527,589 B2 5/2009 Squicciarini
8,360,956 B2 1/2013 Squicciarini
9,042,993 B2 * 5/2015 Cook ................... A61N 1/0408
607/150
9,364,667 B1 6/2016 Dinsmoor et al.
(Continued)

FOREIGN PATENT DOCUMENTS

CN 113208891 A * 8/2021
EP 2974710 A2 * 1/2016 ............. A61H 19/30
WO WO-2018164631 A1 * 3/2018 ............. A61H 19/00

OTHER PUBLICATIONS

Machine translation of written description and claims for CN113208891A via espacenet (Year: 2014).*
(Continued)

*Primary Examiner* — Timothy A Stanis
*Assistant Examiner* — Tyler A Raubenstraw
(74) *Attorney, Agent, or Firm* — Holtz, Holtz & Volek PC

(57) ABSTRACT

Embodiments of the present invention disclose a sexual stimulation device. The sexual stimulation device includes a housing and at least one linkage member. The sexual stimulation device further includes at least one actuation member, one or more stimulation elements, and a control circuitry. The at least one actuation member and the one or more stimulation elements are disposed in the housing. The control circuitry is configured at least to receive a control instruction and generate a control signal by appending operating parameters. The operating parameters are determined corresponding to data associated with a control instruction. The control signal selectively operates the at least one actuation member to activate the one or more stimulation elements. Further, activating the one or more stimulation elements performs predefined actions corresponding to the operating parameters, thereby providing sexual stimulation to the user's body while the sexual stimulation is in contact the user's body.

13 Claims, 10 Drawing Sheets

(56) References Cited

U.S. PATENT DOCUMENTS

| | | | | |
|---|---|---|---|---|
| 9,844,486 | B2 | 12/2017 | Lee | |
| 10,322,282 | B2 | 6/2019 | Wei et al. | |
| 11,737,949 | B1 * | 8/2023 | Huang | A61H 19/32 600/38 |
| 11,752,063 | B1 * | 9/2023 | Huang | A61H 19/32 600/38 |
| 11,857,483 | B1 * | 1/2024 | Huang | A61H 19/32 |
| 11,925,592 | B1 * | 3/2024 | Huang | A61H 19/32 |
| 11,963,919 | B1 * | 4/2024 | Chen | A47G 9/1081 |
| 11,980,582 | B1 * | 5/2024 | Wang | A61H 23/0254 |
| 2005/0288611 | A1 * | 12/2005 | Fang | A61H 19/40 601/69 |
| 2006/0129028 | A1 | 6/2006 | Krakousky | |
| 2012/0184884 | A1 | 7/2012 | Dyer et al. | |
| 2013/0123674 | A1 * | 5/2013 | Carter | A61H 23/0245 601/46 |
| 2013/0197302 | A1 * | 8/2013 | Levy | A61H 23/00 600/38 |
| 2014/0088468 | A1 * | 3/2014 | Murison | F04B 11/0091 601/150 |
| 2014/0094722 | A1 * | 4/2014 | Wu | A61H 23/0263 601/14 |
| 2014/0378759 | A1 * | 12/2014 | Fang | A61H 23/02 600/38 |
| 2016/0120737 | A1 * | 5/2016 | Sedic | A61H 19/44 601/46 |
| 2016/0136034 | A1 * | 5/2016 | Cai | A61H 19/32 600/38 |
| 2017/0071818 | A1 * | 3/2017 | Chen | A61H 19/32 |
| 2018/0229070 | A1 * | 8/2018 | Mcbride | A63B 21/068 |
| 2018/0296383 | A1 * | 10/2018 | Blanche | A61H 19/44 |
| 2018/0344565 | A1 * | 12/2018 | Sloan | A61H 19/32 |
| 2020/0046599 | A1 * | 2/2020 | Sedic | A61F 5/41 |
| 2020/0163825 | A1 * | 5/2020 | Cambridge | A61H 19/44 |
| 2021/0038469 | A1 * | 2/2021 | Zegenhagen | A61H 19/44 |
| 2021/0059896 | A1 * | 3/2021 | Truckai | A61H 9/0057 |
| 2021/0177691 | A1 * | 6/2021 | Shahoian | H04W 12/0433 |
| 2021/0186798 | A1 * | 6/2021 | Tang | A61H 19/32 |
| 2021/0196560 | A1 * | 7/2021 | Liu | A61H 9/0092 |
| 2021/0299441 | A1 | 9/2021 | Edgerton et al. | |
| 2021/0401409 | A1 * | 12/2021 | Nakamura | A61B 10/0058 |
| 2022/0331196 | A1 * | 10/2022 | Sloan | H04N 21/251 |
| 2022/0370287 | A1 * | 11/2022 | Huang | A61H 23/0254 |
| 2023/0012669 | A1 * | 1/2023 | Liu | A61H 19/32 |
| 2023/0024137 | A1 * | 1/2023 | Larkin | A61H 19/44 |
| 2023/0044372 | A1 * | 2/2023 | Liu | A61H 9/0007 |
| 2023/0372191 | A1 * | 11/2023 | Gu | A61H 9/0078 |
| 2024/0001116 | A1 | 1/2024 | Edgerton et al. | |
| 2024/0050306 | A1 * | 2/2024 | Sloan | A61H 19/00 |
| 2024/0245575 | A1 * | 7/2024 | Marshall | A61H 15/0085 |
| 2024/0277560 | A1 * | 8/2024 | Hibri | A61H 19/32 |

OTHER PUBLICATIONS

Andrei Krassioukov, MD. PHD, FRCPC and Stacy Elliot, MD, Neural Control and Physiology of Sexual Function: Effect of Spinal Cord Injury, Topics in Spinal Cord Injury Rehabilitation (https://meridian.allenpress.com/tscir/article/23/1/1/85588/Neural-Control-and-Physiology-of-Sexual-Function), Winter 2017, 10 pages, vol. 23-Issue 1, Vancouver, Canada.

* cited by examiner

SEXUAL STIMULATION DEVICE

TECHNICAL FIELD

The present invention relates generally to devices for sexual pleasure, and more particularly relates to sexual stimulation devices for providing sexual stimulation to users.

BACKGROUND

Self-sexual intercourse (or masturbation) is a common activity among adults irrespective of gender, race, and so forth. Masturbation is generally referred to as the stimulation of genital organs to obtain sexual pleasure.

Sexual pleasure can be achieved by an individual or a group of individuals (irrespective of gender) by using sex toys. Conventional, sex toys are generally simple and can have a vibration feature for providing sexual pleasure. In conventional sex toys, a degree of sexual stimulation may be manually controlled. However, as these conventional sex toys are self-operated by the individual for experiencing sexual pleasure by using a single setting in the sex toy, the individual may not always feel the same level of stimulation at every instance using the conventional sex toy. Additionally, the arousal of the individual may change periodically based on mood and environment, thus the stimulation produced by the adult toy using the single vibration setting may not satisfy the individual. The vibration stimulation effect is related to the intensity of a vibrating motor equipped in the sex toy. However, installation of the vibrating motor in the sex toys is difficult. Further, when the vibrating motor is operating at high frequency there is a significant increase in the noise, thus resulting in an unpleasant experience. In addition, the sex toys may be configured to provide suction action for providing stimulation to the users. The suction action may be provided using a suction element equipped in the sex toys. In most cases, the suction element may not be able to perform frequent suction actions (inflate and/or deflate) which results in an unsatisfactory experience for the user.

Therefore, there is a need for a sexual stimulation device to provide a satisfying masturbation experience to the individual, in addition to providing other technical advantages.

SUMMARY

Various embodiments of the present disclosure disclose a sexual stimulation device for sexual pleasure.

In an embodiment, a sexual stimulation device is disclosed. The sexual stimulation device includes a housing and at least one linkage member. Further, each linkage member of the at least one linkage member includes a first end coupled to the housing and a second end disposed freely relative to the housing. The sexual stimulation device further includes at least one actuation member and one or more stimulation elements. The at least one actuation member and the one or more stimulation elements are disposed in the housing. The one or more stimulation elements are operatively coupled to the at least one linkage member. Further, the sexual stimulation device includes a control circuitry. The control circuitry is operatively coupled to at least the at least one actuation member, and the one or more stimulation elements. The control circuitry is configured to at least activate the one or more stimulation elements performs predefined actions corresponding to operating parameters appended in a control signal, thereby providing sexual stimulation to the user's body while the sexual stimulation device is in contact with the user's body.

In another embodiment, a sexual stimulation device is disclosed. The sexual stimulation device includes a housing, one or more stimulation elements, and at least one actuation member disposed in the housing. The at least one actuation member is fluidically coupled to the one or more stimulation elements through a valve assembly. The valve assembly includes at least a first channel and a second channel. The first channel is fluidically coupled to the one or more stimulation elements and the actuation member, and the second channel is fluidically coupled to the actuation member and the ambient atmosphere. Further, the sexual stimulation device includes a control circuitry operatively coupled to the at least one actuation member and the one or more stimulation elements. The control circuitry is configured to regulate the valve assembly for actuating the at least one actuation member to operate the one or more stimulation elements between an expanded state and a compressed state through at least one of the first channel and the second channel to provide sexual stimulation to the user's body while the sexual stimulation device is in contact with the user's body.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features.

Various embodiments of the present invention are described hereinafter with reference to FIG. 1 to FIGS. 11A and 11B.

Figure 1:
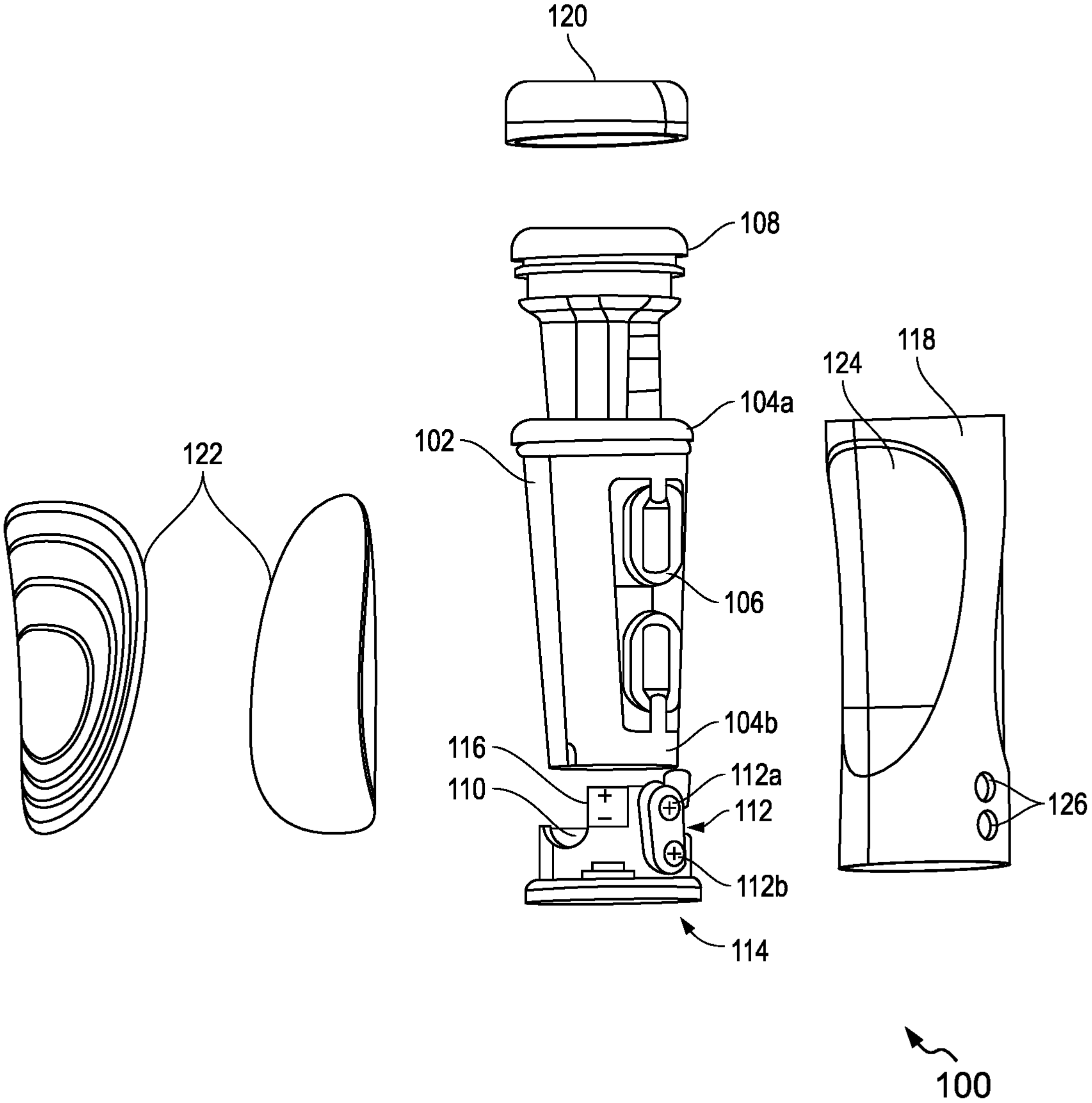
FIG. 1 illustrates an exploded view of a sexual stimulation device, in accordance with an embodiment of the present disclosure.

FIG. 1 illustrates an exploded view of a sexual stimulation device 100, in accordance with an embodiment of the present disclosure. The sexual stimulation device 100 may be configured with one or more operating features for providing sexual stimulation to a user. In the illustrated embodiment, the sexual stimulation device 100 may be a male masturbator configured to provide sexual stimulation to a male user. Alternatively, the sexual stimulation device may be used to provide sexual stimulation to any user irrespective of gender. In general, the sexual stimulation device 100 may be configured to mimic and/or imitate the inspiratory and expiratory effects of a human mouth for providing sexual stimulation and/or to provide sexual stimulation using the vibration feature. In other words, the sexual stimulation device 100 is designed to simulate realistic and satisfying masturbating experiences to users which is explained further in greater detail.

The sexual stimulation device 100 includes a housing 102. The housing 102 is configured to be a substantially hollow structure for accommodating one or more components of the sexual stimulation device 100. The housing 102 includes a proximal portion 104*a* and a distal portion 104*b*. In an embodiment, the housing 102 may be a unitary structure. In another embodiment, the housing 102 may be formed by detachably coupling one or more structures using suitable coupling means such as, but not limited to, screws, snap-fit arrangement, and so forth. The detachable configuration of the housing 102 allows access to components or elements housed inside the housing 102. For example, while adjusting or repairing any internal component or element housed within the housing 102. Further, the housing 102 may be made of suitable materials such as, but not limited to, plastic, metal, rubber, wood, and any combination thereof. Furthermore, the housing 102 may be made of suitable manufacturing techniques, for example, extrusion, molding, and so forth.

The sexual stimulation device 100 includes one or more stimulation elements 106 disposed in the housing 102. The stimulation elements 106 are configured to provide sexual stimulation to the user. The sexual stimulation device 100 further includes at least one actuation member disposed in the housing (not shown in FIG. 1). The actuation member is operatively coupled to the stimulation members for providing sexual stimulation to the user. In one embodiment, the stimulation elements 106 are integrated with the actuation member. The stimulation elements and the actuation members are integrated together as a component.

The sexual stimulation device 100 further includes an accommodating element 108. The accommodating element 108 is disposed in the housing 102 from the proximal portion 104*a* to the distal portion 104*b*. The accommodating element 108 is configured to receive a genital organ (e.g., penis) therein. Further, the accommodating element 108 projects out of the proximal portion 104*a* of the housing 102 when the accommodating element 108 is disposed in the housing 102 (as shown in FIG. 5B). The accommodating element 108 may be made of flexible materials such as, but not limited to, Thermoplastic elastomers (TPE).

The sexual stimulation device 100 further includes a control circuitry 110. The control circuitry 110 may be housed in the housing 102. In an embodiment, the control circuitry 110 may be communicably coupled to the sexual stimulation device 100 using wireless communication protocols. Further, the control circuitry 110 is configured to receive a control instruction via a communication interface (not shown in Figures). The control instruction is received based on inputs provided in at least one input interface 112. The input interface 112 is positioned in a bottom portion 114 of the sexual stimulation device 100. The input interface 112 is operatively coupled to the control circuitry 110 through a communication interface (e.g., wired connection). The user may apply force onto the input interface 112 for operating the sexual stimulation device 100. In other words, the user may press the input interface 112 to operate the sexual stimulation device 100. In this scenario, the input interface 112 transmits a control instruction to the control circuitry 110. The control instruction includes data related to a magnitude of force applied on the input interface 112. Thereafter, the control circuitry 110 determines operating parameters corresponding to data associated with the control instruction (i.e., the magnitude of force applied on the input interface 112). Further, the control circuitry 110 generates a control signal by appending the operating parameters and transmits the control signal to the actuation members. The control signal selectively operates the actuation members to activate the stimulation elements 106. Further, activating the stimulation elements 106 performs predefined actions corresponding to the operating parameters, thereby providing sexual stimulation to the user's body while the sexual stimulation is in contact with the user's body. The predefined actions may be a vibrotactile output or a squeezing action.

The sexual stimulation device 100 includes a power source 116. The power source 116 is disposed in the housing 102. The power source 116 is operatively coupled (e.g., wired connection) to the control circuitry 110, the stimulation elements 106, and the actuation members. The power source 116 is configured to provide electrical power to one or more operating components (for example, the stimulation elements 106, the control circuitry 110, the actuation members, etc.) of the sexual stimulation device 100. The power source 116 may be configured to provide an alternating current output or a direct current output. In an embodiment, the power source 116 includes a direct current power source, such as a rechargeable battery (for example, a lithium-ion (Li-on) battery), operable to provide the required electrical power for the operation of the stimulation elements 106 or the actuation members. Further, the power source 116 may include electrical and/or electronic components or circuits for enabling the use of wired or wireless charging. Alternatively, the power source 116 may include electrical and/or electronic components or circuits for enabling the use of alternating current to provide the required electrical power for the operation of the stimulation elements 106 and the actuation members.

The sexual stimulation device 100 includes an outer covering structure 118 and a top cover 120. The outer covering structure 118 is configured to encase the housing supporting the components of the sexual stimulation device 100. Further, the outer covering structure 118 may be mounted with at least one anti-skid structure 122 on at least a portion of the outer covering structure 118. In particular, the portion of the outer covering structure 118 may be defined with an accommodating space 124 for receiving the anti-skid structures 122. The anti-skid structures 122 may be configured with indentations to enhance the gripping of the sexual stimulation device 100. In addition, the outer covering structure 118 is configured with grooves 126. The input interface 112 is positioned in the grooves 126 when the outer covering structure 118 is secured onto the housing 102. In an embodiment, the anti-skid structures 122 may be integrally formed in the outer covering structure 118. Further, the top cover 120 is mounted to the proximal portion 104*a*. This allows the user to access the accommodating element 108 for cleaning purposes.

Figure 2A:
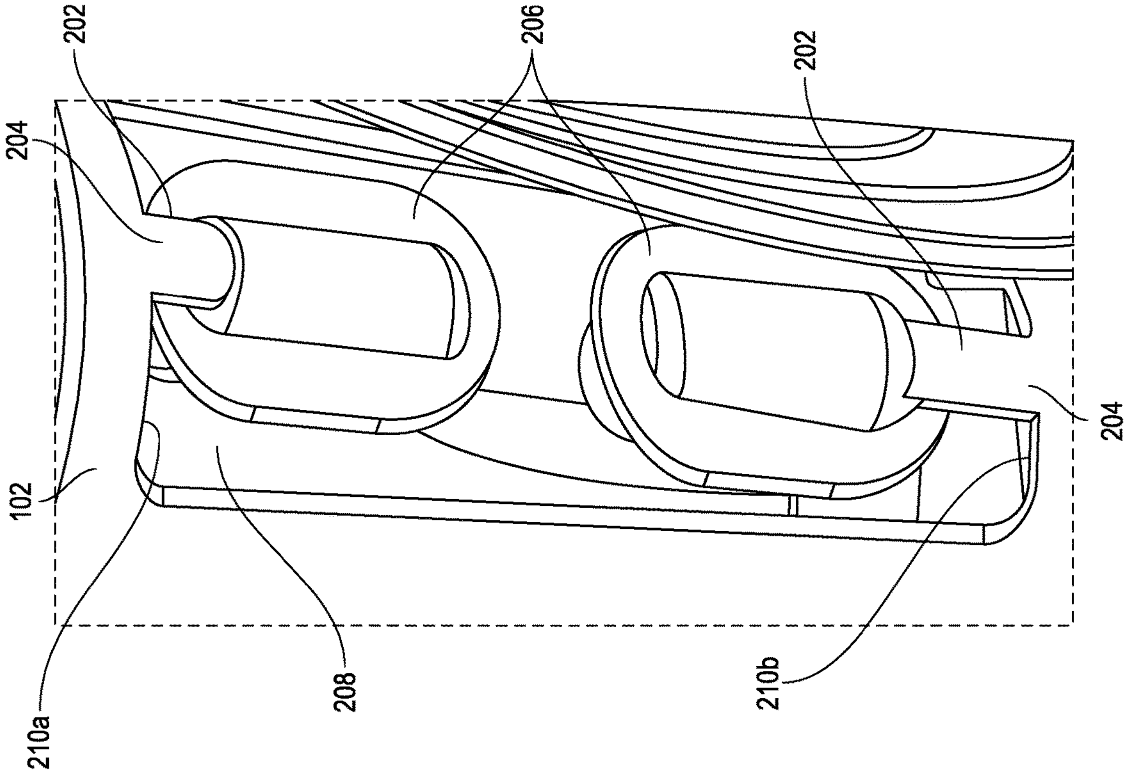
FIG. 2A illustrates a sectional view of the sexual stimulation device depicting a housing including at least one linkage member and a first stimulation element, in accordance with an embodiment of the present disclosure.

Referring to FIG. 2A in conjunction with FIG. 1, the sexual stimulation device 100 includes at least one linkage member 202. Further, each linkage member of the at least one linkage member 202 includes a first end 204 and a second end (see, 212 of FIG. 2B). The first end 204 is coupled to the housing 102. In particular, the housing 102 includes a cut-out portion 208. The at least one linkage member 202 is mounted at opposite sides of the cut-out portion 208 (as shown in FIG. 2A). The first end 204 is mounted to a first side 210*a* and a second side 210*b* of the cut-out portion 208. In other words, the first end 204 of the linkage members 202 laterally extends from each of the first side 210*a* and the second side 210*b* of the cut-out portion 208 defined in the housing 102. In an embodiment, the first end 204 of the linkage members 202 may be fixedly mounted (or integrated) to the housing 102. In another embodiment, the first end 204 of the linkage members 202 may be mounted to the housing 102 using conventional means such as adhesives, screws, etc.

Figure 2B:
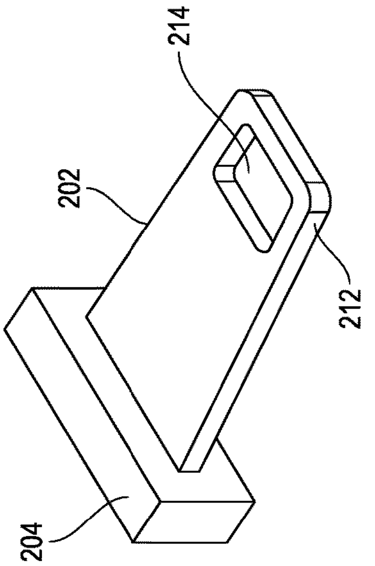
FIG. 2B illustrates a perspective view of a linkage member of the at least one linkage member of FIG. 2A, in accordance with an embodiment of the present disclosure.

Further, the second end 212 is disposed (freely) relative to the housing 102. The second end 212 may be operatively coupled to the stimulation elements 106. The stimulation elements 106 includes a first stimulation element 206. The first stimulation element 206 may include an installation structure (not shown in Figures) configured to couple with a complementary installation structure (see, 214 of FIG. 2B) of the linkage members 202. In an embodiment, the first stimulation element 206 and the linkage members 202 may be a unitary structure. The complementary installation structure 214 of the linkage members 202 depicted in FIG. 2B is for exemplary purposes. Further, the installation structure and the complementary installation structure 214 may be configured in any other configurations as per design feasibility and requirement.

Additionally, the at least one linkage member 202 and the first stimulation element 202 may include a conductive interface (not shown in Figures). The conductive interface may be similar to a magnetic charging interface or a magnetic strip. Thus, coupling the first stimulation element 206 with the linkage members 202 enables coupling (or magnetic coupling) of the conductive interface associated with the first stimulation element 206 and the linkage members 202. In other words, the linkage members 202 and the first stimulation element 206 may be electrically coupled to each other.

Figure 3:
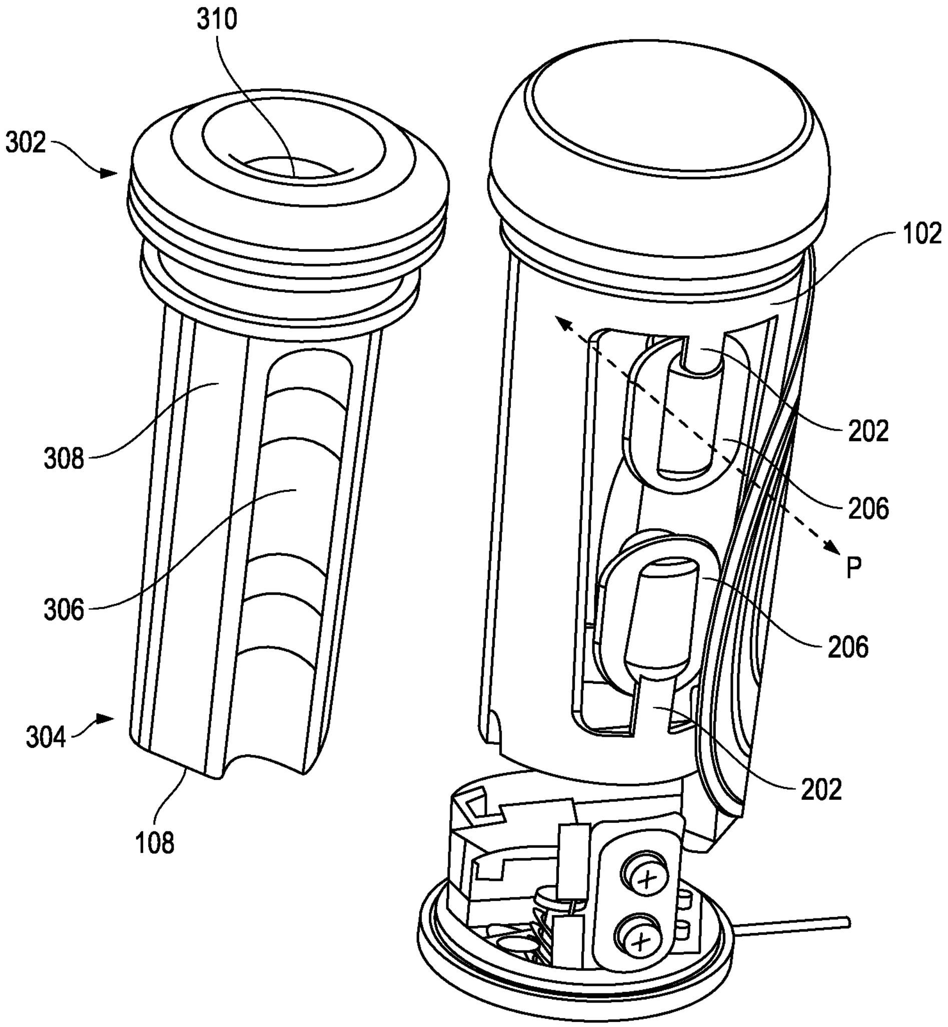
FIG. 3 illustrates a perspective of the sexual stimulation device depicting an accommodating element and the housing, in accordance with an embodiment of the present disclosure.

Referring to FIG. 3 in conjunction with FIG. 1, the accommodating element 108 includes a top portion 302, a bottom portion 304, and a recessed area 306. The top portion 302 is configured in an open configuration for allowing insertion of male genitalia (e.g., penis) therein. In other words, the top portion 302 includes a flexible opening 310 for receiving a penis of the user. It is to be noted that the top portion 302 is projected out of the housing 102 for receiving the male genitalia therein. The accommodating element 108 is configured to provide sexual stimulation due to a combined operation of the actuation members and the stimulation elements 106. In an embodiment, the top portion 302 of the accommodating element 108 may be configured to have a shape of a vagina to enable in creating desired sexual stimulus or arousal for the user while masturbating using the sexual stimulation device 100. In another embodiment, the top portion 302 may be configured to have a shape of an anus or multiple shapes (vagina, anus, or a combination thereof), or any other configurations as per the design feasibility and requirements.

It is to be understood that the size of the accommodating element 108 is to be designed such that it can receive therethrough penises of various sizes. Typically, the accommodating element 108 is a flexible and expandable configuration, adapted to adjustably contact and surround the penis based on the size thereof. In one example, the sexual stimulation device 100 may be provided with multiple accommodating elements, such as the accommodating element 108, each having a different size of the flexible opening at the top portion 302 to accommodate varying diametrical sizes of the penis. Further, the bottom portion 304 is configured to be a closed configuration.

The recessed area 306 is configured along at least a length of an outer wall 308 of the accommodating element 108. The recessed area 306 is configured in conformity with the structural configuration of the first stimulation element 206. The recessed area 306 is adapted to receive at least a portion of the first stimulation element 206. In this way, the first stimulation element 206 contacts the accommodating element 108 via the recessed area 306. The first stimulation element 206 is operated to provide sexual stimulation to the male genitalia inserted in the accommodating element 108. In this embodiment, the first stimulation element 206 is operated to provide sexual stimulation to the male genitalia against the accommodating element 108.

Figure 4:
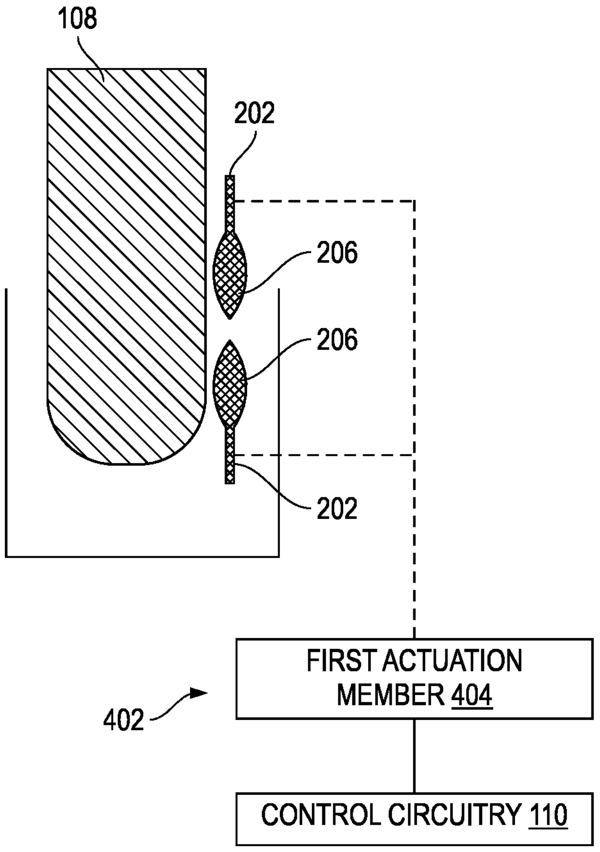
FIG. 4 is a schematic representation of the internal operating components of the sexual stimulation device, in accordance with an embodiment of the present disclosure.

Referring to FIG. 4, the sexual stimulation device 100 includes at least one actuation member (see, 402). The actuation member 402 includes a first actuation member 404. The first actuation member 404 may include electric actuators (motor), piezoelectric actuators, and the like. The first actuation member 404 is operatively coupled to the at least one linkage member 202 and the control circuitry 110. The control circuitry 110 generates a control signal to operate the first actuation member 404. In particular, the control circuitry 110 generates a first control signal by appending operating parameters to operate the first actuation member 404. The operating parameters for the first control signal may include an operating intensity and an operating time. The operating time and the operating intensity may be determined based on the magnitude of force applied on a first input interface 112*a* of the input interface 112. The first control signal operates the first actuation member 404 which in turn operates the first stimulation element 206 to perform predefined actions to provide sexual stimulation while the sexual stimulation device is in contact with the user's body. Further, operating the first stimulation element 206 activates the at least one linkage member 202 moving in a predefined direction (see, direction 'P' in FIG. 3) relative to the housing 102 due to polarization of the at least one linkage member 202. To that effect, the first stimulation element 206 is activated to provide enhanced sexual stimulation while the sexual stimulation device 100 is in contact with the user's body. The first stimulation element 206 operating the predefined direction 'P' corresponds to the predefined direction of the linkage members 202. Further, the first stimulation element 206 operating in the predefined direction 'P' may provide a vibrotactile output to the male genitalia inserted in the accommodating element 108. In one embodiment, the first stimulation element 206 which is operatively coupled to the linkage member 202 is inclined at a certain angle relative to at least one of the accommodating element 108 and the housing 102, rather than being set parallel.

Figure 5A:
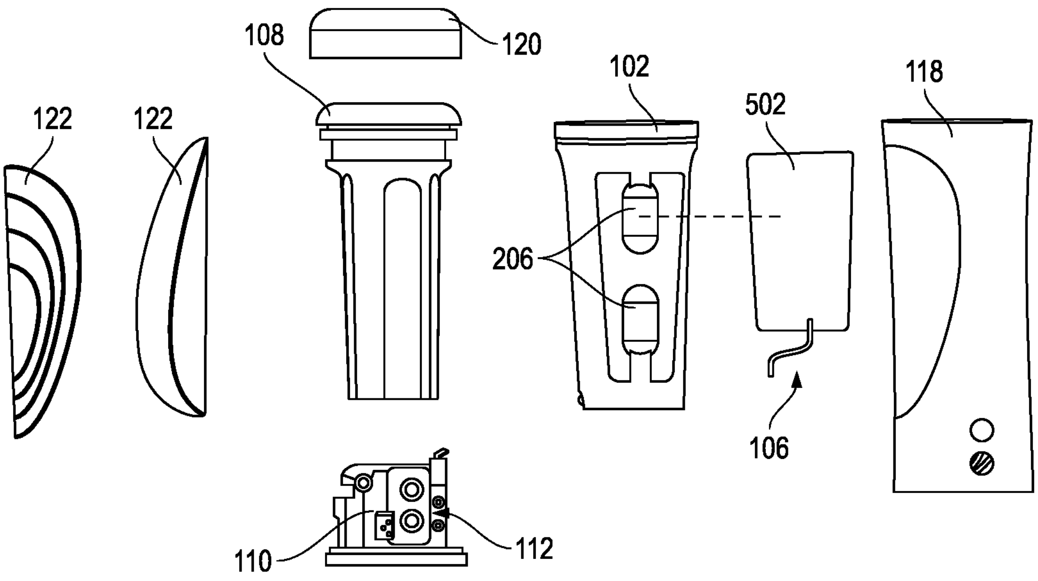
FIGS. 5A and 5B illustrate an exploded view of the sexual stimulation device depicting a second stimulation element, in accordance with an embodiment of the present disclosure.
Figure 5B:
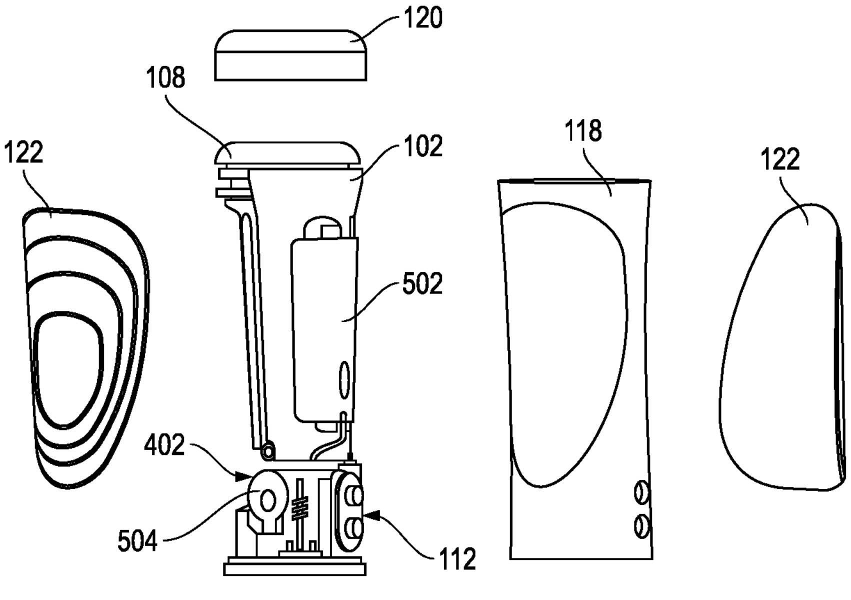

Referring to FIG. 5A, the one or more stimulation elements 106 includes a second stimulation element 502. The second stimulation element 502 encompasses at least a portion of the first stimulation element 206 and a portion of the accommodating element 108 of the sexual stimulation device 100. The second stimulation element 502 may be made of flexible materials. The second stimulation element 502 is configured to undergo elastic deformation. Further, a chamber (see, 602 of FIG. 6A) is defined between the second stimulation element 502 (i.e., the outer circumferential surface of the second stimulation element 502) and the first stimulation element 206. The chamber 602 is generally a hollow space or provides space therein. Further, it may be appreciated that the second stimulation element 502 may itself act as a chamber inside the housing 102. In the present examples, the second stimulation element 502 may be any suitable bag made of elastic material and able to withstand air pressures needed for inflation of the second stimulation element 502 to the required extent for compression of the accommodating element 108.

Referring to FIG. 5B, the actuation member 402 includes a second actuation member 504. The second actuation member 504 may include an air pump, piezoelectric pump, etc. The second actuation member 504 is disposed in the bottom portion 114 of the housing 102. The second actuation member 504 is operatively coupled to the control circuitry 110. The control circuitry 110 generates a control signal to operate the second stimulation element 502 between a compressed state and an expanded state. The second stimulation element 502 operated between the compressed state and the expanded state corresponds to the predefined actions of the second stimulation element 502. In other words, the control of inflation and deflation of the chamber 602 due to the operation of the second actuation member 504 (e.g., air pump) which will be explained further in detail.

Figure 6A:
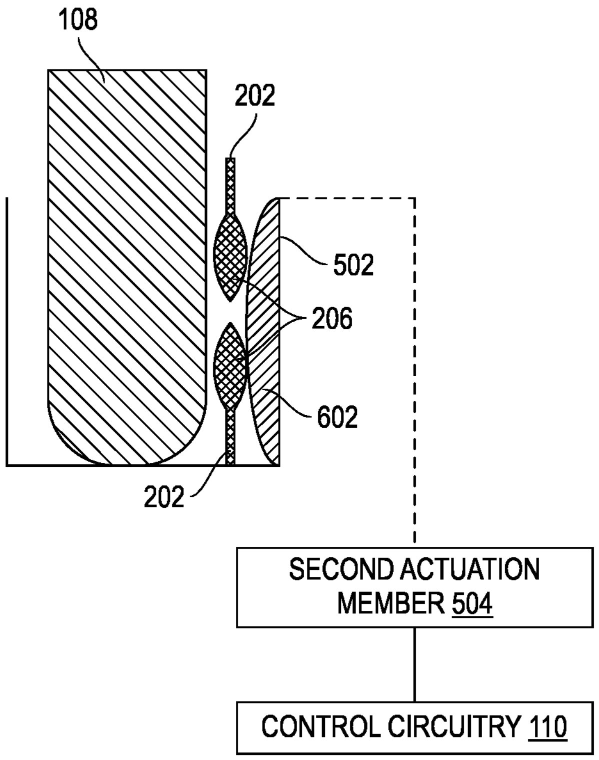
FIG. 6A is a schematic representation of the internal operating components of the sexual stimulation device, in accordance with an embodiment of the present disclosure.

Referring to FIG. 6A, the second stimulation element 502 encompasses at least a portion of the first stimulation element 206. In an embodiment, the second stimulation element 502 may encompass the portion of the first stimulation element 206 and a part of the accommodating element 108. The control circuitry 110 generates a second control signal by appending operating parameters to operate the second actuation member 504. The operating parameters may include operating pressure, operating frequency, and operating time. The operating time, the operating pressure, and the operating frequency may be determined based on the magnitude of force applied on a second input interface 112*b* of the input interface 112. The second control signal operates the second actuation member 504 which in turn operates the second stimulation element 502. To that effect, the second stimulation element 502 is operated between a compressed state and an expanded state. The second stimulation actuation 504 is fluidically coupled to the second stimulation element 502 and the ambient atmosphere. The second actuation member 504 operates the second stimulation element 502 in the expanded state by blowing out air from the ambient atmosphere within the chamber 602 of the second stimulation element 502 based on the operating pressure. Further, the second actuation member 504 operates the second stimulation element 502 in the compressed state by drawing air from within the chamber 602 of the second stimulation element 502. The second stimulation element 502 operating in the compressed state and the expanded state provides a squeezing action to the accommodating element 108, thereby providing sexual stimulation to the male genitalia inserted therein. In addition, the second stimulation element 502 operating in the compressed state and the expanded state activates the first stimulation element 206. Hence, a combined operation of the second stimulation element 502 and the first stimulation element 206 operates the accommodating element 108 to perform the predefined actions thereby enabling the accommodating element 108 to provide sexual stimulation to the user's body. In other words, the second stimulation element 502 is configured to undergo elastic deformation to provide squeezing action corresponding to the magnitude of force applied on the input interface 112 (i.e., the second input interface 112*b*).

Figure 6B:
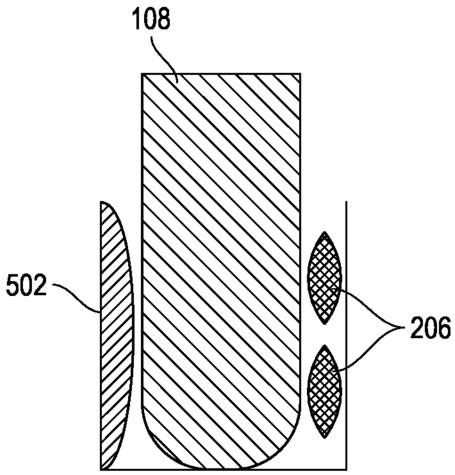
FIGS. 6B and 6C, illustrate the mounting of one or more stimulation elements of the sexual stimulation device, in accordance with an embodiment of the present disclosure.
Figure 6C:
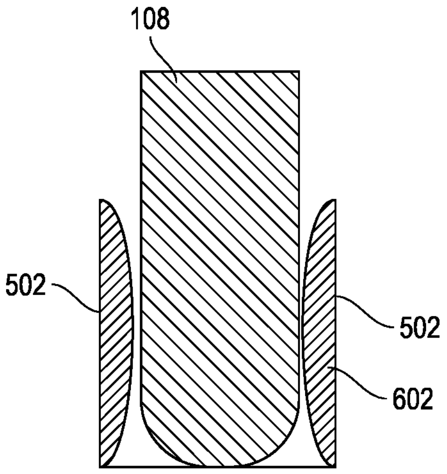

In an embodiment, the second stimulation element 502 is disposed in the sexual stimulation device 100 such that the second stimulation element 502 encompasses only a portion of the accommodating element 108 (as shown in FIG. 6B). In other words, the second stimulation element 502 may adhere to an inner wall (not shown in Figures) of the outer covering structure 118. The second stimulation element 502 adhered to the inner wall of the outer covering structure 118 encompasses the portion of the accommodating element 108 when the outer covering structure 118 is secured to the housing 102. Thus, the first stimulation element 206 is located at one side of the accommodating element 108 and the second stimulation element 502 is located on another side of the accommodating element 108 (as shown in FIG. 6B). In another embodiment, only the second stimulation element 502 is disposed in the sexual stimulation device 100 (as shown in FIG. 6C). It is to be noted that two stimulation elements (i.e., the second stimulation element 502) are disposed on either side of the accommodating element 108. In both scenarios, the chamber 602 is defined between the second stimulation element 502 (i.e., the outer circumferential surface of the second stimulation element 502) and the portion of the accommodating element 108. Further, in both scenarios, the second stimulation element 502 operating between the expanded state and the compressed state directly impacts the accommodating element 108 to provide sexual stimulation to the male genitalia inserted therein.

Figure 7A:
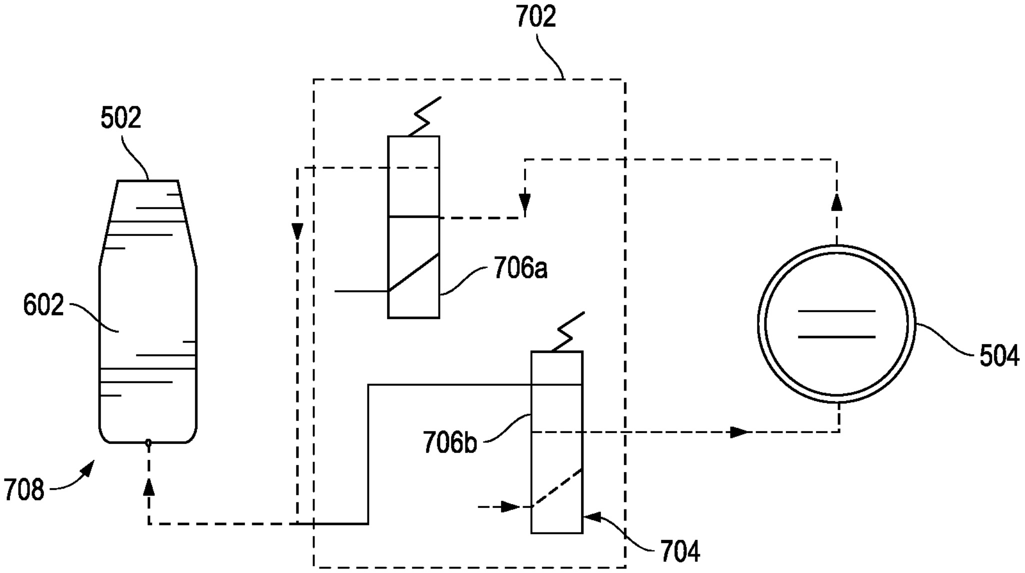
FIGS. 7A and 7B illustrate a schematic representation of a second actuation member fluidically coupled to a second stimulation element through a valve assembly, in accordance with an embodiment of the present disclosure.
Figure 7B:
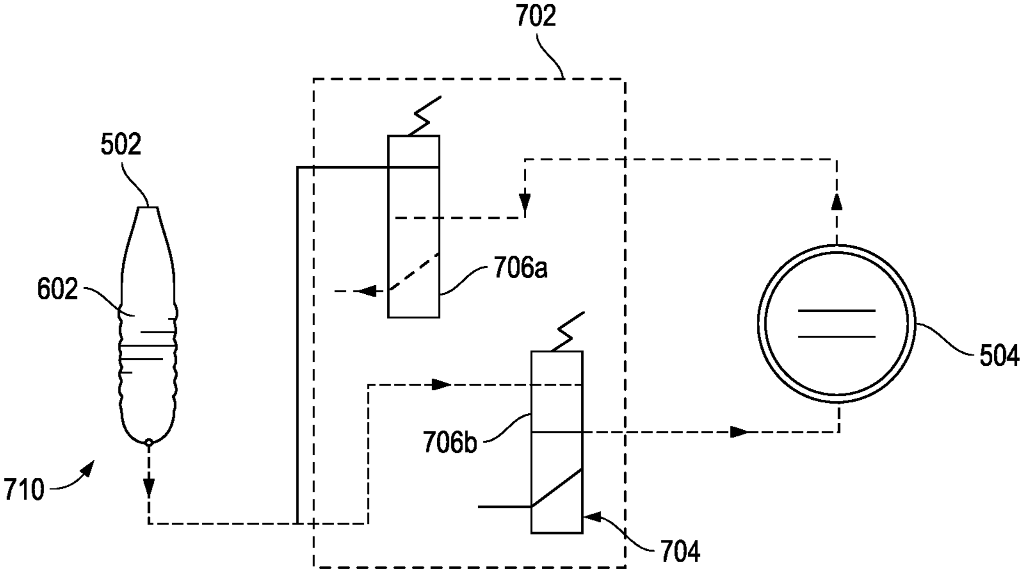

FIGS. 7A and 7B illustrate a schematic representation of the second actuation member 504 fluidically coupled to the second stimulation element 502 through a valve assembly 702, in accordance with an embodiment of the present disclosure. As shown, the second actuation member 504 is fluidically coupled to the second stimulation element 502 and the ambient atmosphere through the valve assembly 702. The valve assembly 702 may include a set of valves 704. The set of valves 704 is fluidically coupled to the second actuation member 504 and the second stimulation element 502 and operated in a first mode and a second mode to operate the second stimulation element 502 in the expanded state and the compressed state, respectively. Therefore, the second stimulation element 502 is configured to be alternately inflated and deflated (rapidly) through the valve assembly 702, and there is no need to manually deflate the air pressure of the second stimulation element 502. The rapid alternate inflation and deflation of the second stimulation element 502 can improve the stimulation effect of the sexual stimulation device 100.

The valve assembly 702 may be a dual-channel valve assembly (as shown in FIGS. 7A and 7B). In this example, the set of valves 704 of the valve assembly 702 includes a first valve **706*a* and a second valve 706*b*. The first valve 706*a* and the second valve 706*b* may be referred to as a first channel and a second channel. As shown in FIG. 7A, the first valve 706*a* is fluidically coupled to the second stimulation element 502 and the second actuation member 504, and the second valve 706*b* is fluidically coupled to the second actuation member 504** and the ambient atmosphere.

In the first mode, the first valve **706*a* (or the first channel) is configured to inflate the second stimulation element 502 and the second valve 706*b* (or the second channel) draws in (or inhales) air from the ambient atmosphere. In particular, the second actuation member 504 operates the second valve 706*b* to allow the inflow of air from the ambient atmosphere into the sexual stimulation device 100 (as shown in FIG. 7A). Thereafter, the second actuation member 504 operates the first valve 706*a* to route the inflow of air into the chamber 602 of the second stimulation element 502 (as shown in FIG. 7A). Thus, operating the second stimulation element 502 in an expanded state 708 (as shown in FIG. 7**A).

In the second mode, the second valve **706*b* (or the second channel) is configured to inhale from the second stimulation element 502 and the first valve 706*a* (or the first channel) expels air to the ambient atmosphere. In particular, the second actuation member 504 operates the second valve 706*a* to draw out air from within the chamber 602 of the second stimulation element 502 (as shown in FIG. 7B). Thereafter, the second actuation member 504 operates the first valve 706*a* to route the air to the ambient atmosphere (as shown in FIG. 7B). Thus, operating the second stimulation element 502 in a compressed state 710 (as shown in FIG. 7**B).

Figure 8A:
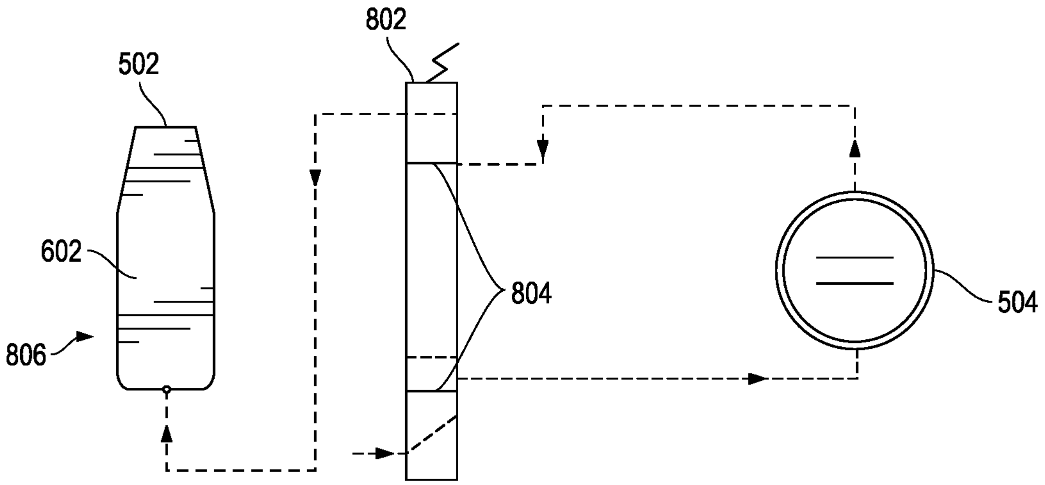
FIGS. 8A and 8B illustrate a schematic representation of a second actuation member fluidically coupled to a second stimulation element through a valve assembly, in accordance with an embodiment of the present disclosure.
Figure 8B:
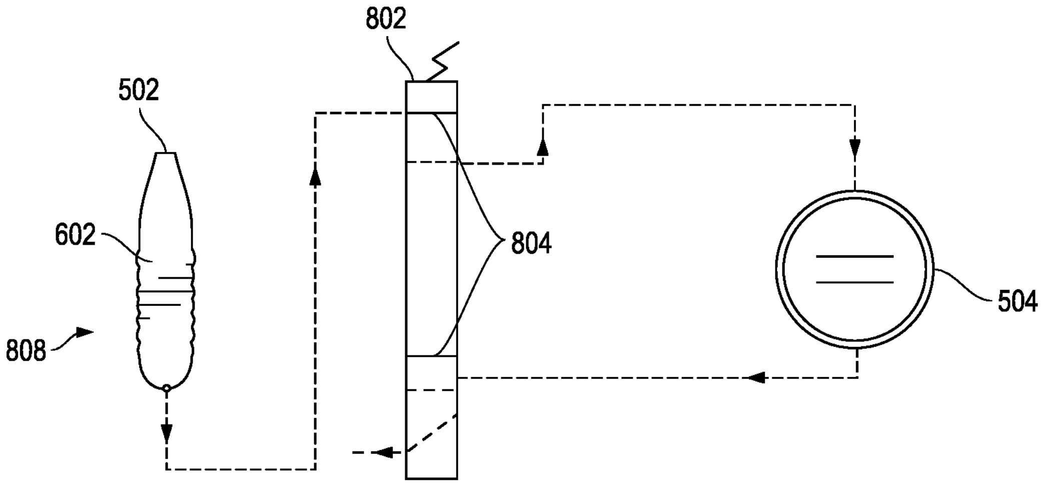

FIGS. 8A and 8B illustrate a schematic representation of the second actuation member 504 fluidically coupled to the second stimulation element 502 through a valve assembly 802, in accordance with another embodiment of the present disclosure. As shown, the second actuation member 504 is fluidically coupled to the second stimulation element 502 and the ambient atmosphere through the valve assembly 802. The valve assembly 802 may include a set of valves 804. The set of valves 804 is fluidically coupled to the second actuation member 504 and the second stimulation element 502 and operated in a first mode and a second mode to operate the second stimulation element 502 in the expanded state and the compressed state, respectively.

The valve assembly 802 may be a multi-channel valve assembly (as shown in FIGS. 8A and 8B). In this example, the set of valves 804 of the valve assembly 802 includes multiple valves configured to regulate the air pressure in the second stimulation element 502. Similar to the valve assembly 702, the valve assembly 802 is configured to operate in the first mode and the second mode to cause the second stimulation element to operate in the expanded state (see, 806 of FIG. 8A) and the compressed state (see, 808 of FIG. 8B).

Figure 9A:
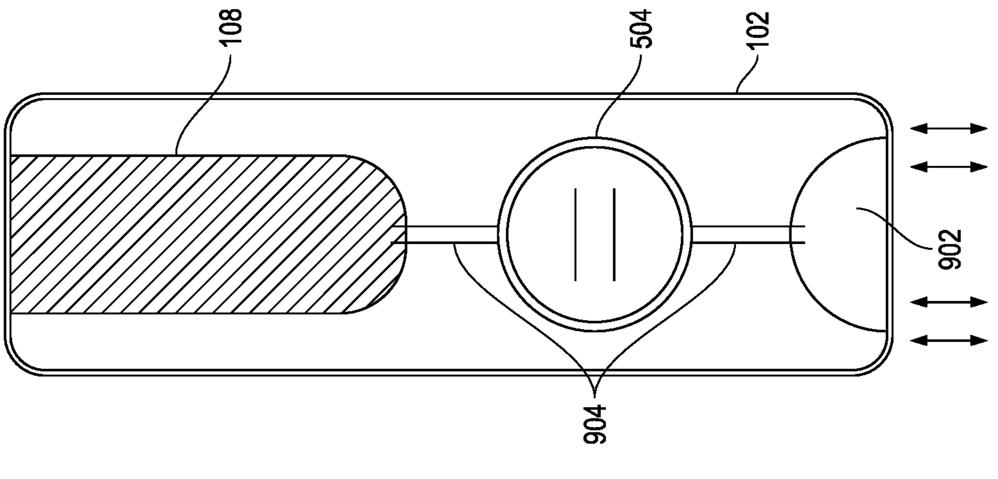
FIG. 9A illustrates a schematic representation of the sexual stimulation device including the second actuation member operatively coupled to the accommodating element through the valve assembly, in accordance with an embodiment of the present disclosure.

FIG. 9A illustrates a schematic representation of the second actuation member 504 operatively coupled to the accommodating element 108, in accordance with an embodiment of the present disclosure. As shown, the housing 102 is configured with a ventilation chamber 902. The ventilation chamber 902 is located at a bottom portion 114 of the sexual stimulation device 100. Alternatively, the ventilation chamber 902 may be configured at any location in the sexual stimulation device 100 as per the design feasibility and requirements.

The ventilation chamber 902 is maintained at an ambient air pressure condition. The ventilation chamber 902 may be fluidically coupled to ambient atmosphere. Alternatively, the ambient atmosphere may be the ventilation chamber 902. In particular, the ventilation chamber 902 is adapted to allow the inflow and outflow of air to and from the sexual stimulation device 100, respectively. Further, the second actuation member 504 is fluidically coupled to the accommodating element 108 via a valve assembly 904. The valve assembly 904 is an example of the valve assembly 802 or the valve assembly 702. In this scenario, the accommodating element 108 may act as the stimulation element (i.e., the stimulation elements 206 and/or the stimulation elements 502) for providing sexual stimulation to the male genitalia inserted therein. Further, the second actuation member 504 is configured to regulate the air pressure of the accommodating element 108 through the valve assembly 902 to cause the accommodating element 108 to provide sexual stimulation. Similar to the second stimulation element 502, the accommodating element 108 may undergo elastic deformation (or provide squeezing action) due to the flexible nature of the accommodating element 108. In an embodiment, the accommodating element 108 expels the air within the accommodating element 108 due to the operation of the second actuation member 504. This may result in the accommodating element 108 being compressed. Further, the second actuation member 504 operates the accommodating element 108 to draw in air from the ambient atmosphere to cause the accommodating element 108 to be expanded. It should be noted that the inflow and outflow of air to and from the accommodating element 108 is due to the flexible opening 310 at the top portion 302 of the accommodating element 108. The squeezing action of the accommodating element 108 is due to the flexible opening 310 at the top portion 302 of the accommodating element 108. Further, the male genitalia inserted in the accommodating element 108 causes the opening 302 to be closed.

Figure 9B:
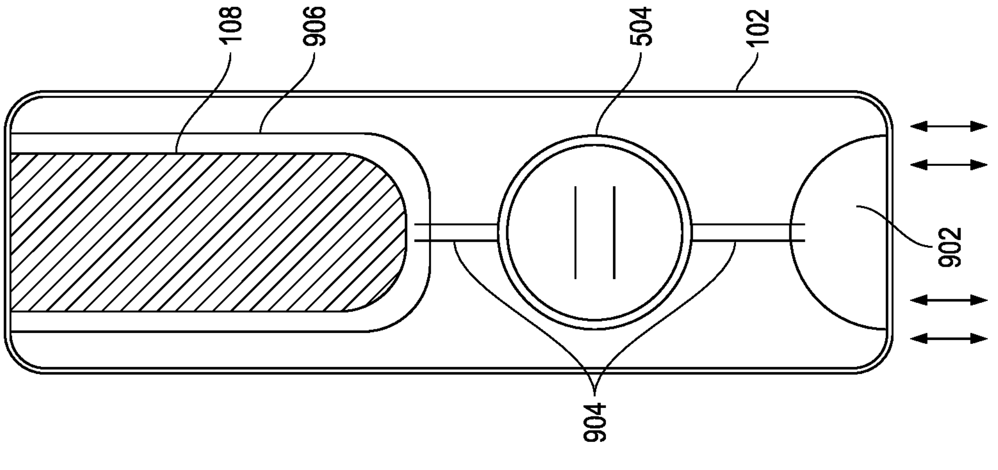
FIG. 9B illustrates a schematic representation of the sexual stimulation device including the second actuation member operatively coupled to an accommodating chamber through the valve assembly, in accordance with an embodiment of the present disclosure.

FIG. 9B illustrates a schematic representation of the second actuation member 504 operatively coupled to an accommodating chamber 906 of the sexual stimulation device 100, in accordance with an embodiment of the present disclosure. As shown, the second actuation member 504 is fluidically coupled to the accommodating chamber 906 via the valve assembly 904. The accommodating chamber 906 may be made of flexible materials. Further, the accommodating element 108 is disposed in the accommodating chamber 906. The valve assembly 904 is an example of the valve assembly 802 or the valve assembly 702. In this scenario, the accommodating element 108 may act as the stimulation element (i.e., the stimulation elements 206 and/or the stimulation elements 502) for providing sexual stimulation to the male genitalia inserted therein. Further, the second actuation member 504 is configured to regulate the air pressure of the accommodating chamber 906 through the valve assembly 902 to cause the accommodating element 108 to provide sexual stimulation. Similar to the second stimulation element 502, the accommodating element 108 and the accommodating chamber 906 may undergo elastic deformation (or provide squeezing action) due to the flexible nature of the accommodating element 108 and the accommodating chamber 906. In an embodiment, the accommodating chamber 906 expels the air from within the accommodating chamber 906 due to the operation of the second actuation member 504. This results in the accommodating chamber 906 being compressed. Further, the second actuation member 504 operates the accommodating chamber 906 to draw in air from the ambient atmosphere to cause the accommodating chamber 906 to be expanded. It should be noted that the inflow and outflow of air to and from the accommodating chamber 906 cause the accommodating element 108 to provide squeezing action, thereby providing sexual stimulation to the male genitalia inserted therein.

In an embodiment, the second actuation member 504 is fluidically coupled to the ventilation chamber (such as the ventilation chamber 906), and the second stimulation element 506 through the valve assembly 904.

Figure 10:
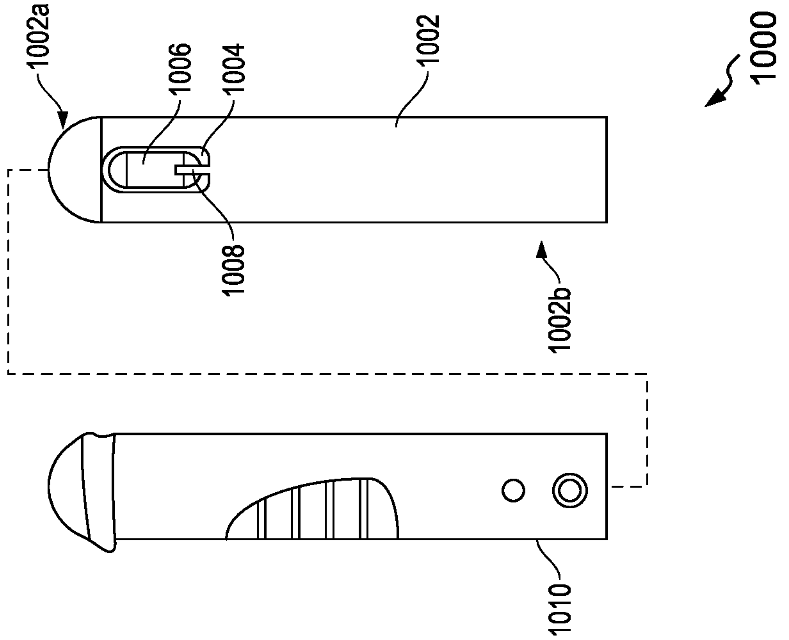
FIG. 10 illustrates a schematic representation of a sexual stimulation device, in accordance with an embodiment of the present disclosure.

FIG. 10 illustrates a schematic representation of a sexual stimulation device 1000, in accordance with an embodiment of the present disclosure. The sexual stimulation device 1000 may be a female sexual stimulation device. Some examples of the female sexual stimulation device may include, but not limited to, a dildo, vibrator, etc. Similar to the sexual stimulation device 100, the sexual stimulation device 1000 includes a housing 1002. The housing 1002 is configured to be a substantially hollow structure for accommodating one or more components of the sexual stimulation device 1000. Further, the housing 1002 may be made of suitable materials such as, but not limited to, plastic, metal, rubber, wood, and any combination thereof. Furthermore, the housing 1002 may be made of suitable manufacturing techniques, for example, extrusion, molding, and so forth.

The sexual stimulation device 1000 includes one or more stimulation elements 1006 disposed in the housing 1002. In particular, the housing 1002 includes a cut-out portion 1004 configured at a proximal portion 1002*a* of the housing 1002. The stimulation elements 1006 are disposed in the housing 1002 and positioned in the cut-out portion 1004. The stimulation elements 1006 is an example of the first stimulation element 206. This enables the stimulation elements 1006 to be in contact with the user's body when the sexual stimulation device 1000 is inserted in the female genitalia (e.g., vagina) or anus. It is to be noted that the stimulation elements 1006 are mounted to at least one linkage member 1008. The structural configuration of the stimulation elements 1006 mounted to the linkage members 1008 are similar to the stimulation elements 106 and the linkage members 202, therefore they are not reiterated herein for the sake of brevity. Further, the sexual stimulation device 1000 may include a flexible element 1010 configured to be removably secured onto the housing 1001. The flexible element 1010 may be made of silicone. The flexible element 1010 is configured to contact the user's body and provide sexual stimulation to the user's body when the sexual stimulation device 1000 is inserted in the female genitalia. In this embodiment, the stimulation elements 1006 are adapted to provide sexual stimulation to the user's body against the flexible element 1010. Furthermore, the sexual stimulation device 1000 may include a control circuitry, at least one actuation member, and a power source (not shown in Figures). The control circuitry, the actuation members, and the power source may be disposed at a bottom portion 1002*b* of the housing 102. The components (e.g., the control circuitry, the actuation members, the stimulation elements 1006) of the sexual stimulation device 1000 may be configured to perform similar operations as explained with reference to the sexual stimulation device 100.

Figure 11B:
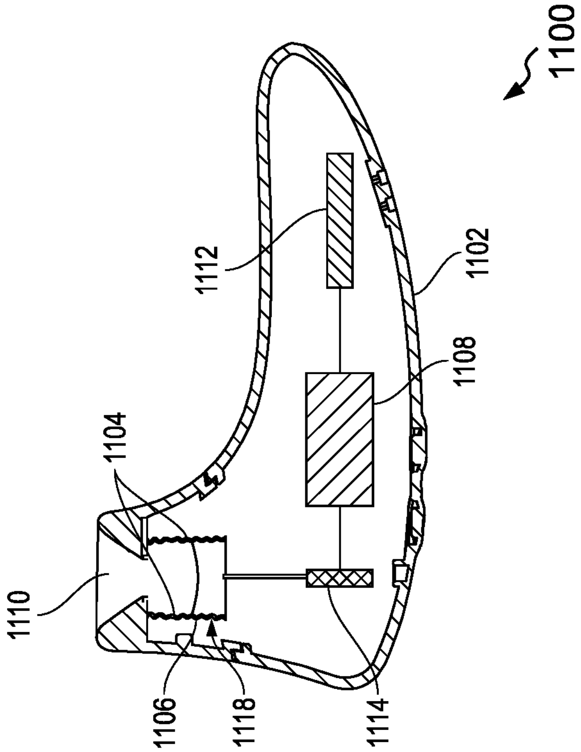
FIGS. 11A and 11B illustrate a schematic representation of a sexual stimulation device, in accordance with an embodiment of the present disclosure.
Figure 11A:
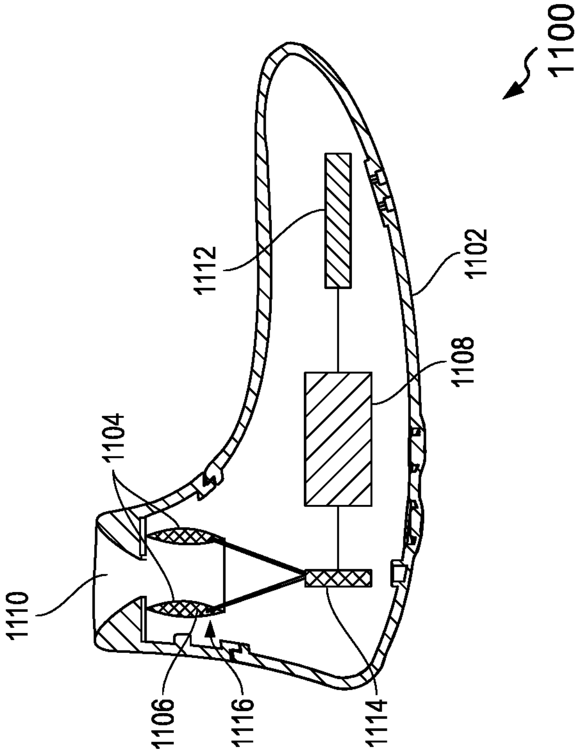

FIGS. 11A and 11B illustrate a schematic representation of a sexual stimulation device 1100, in accordance with an embodiment of the present disclosure. The sexual stimulation device 1100 may be a suction device or a pressure field stimulation device. The sexual stimulation device 1100 may be configured to produce suction action or modifiable pressure field for providing sexual stimulation to the user's body. The sexual stimulation device 1100 includes a housing 1102 and one or more stimulation elements 1104 including a chamber 1106. The stimulation elements 1104 are similar to the second stimulation element 502. The stimulation elements 1104 are made of flexible materials and are configured to undergo elastic deformation. Further, the sexual stimulation device 1110 includes a cavity 1110 to contact with the user's body. The chamber 1106 and the cavity 1110 are in fluid communication. In another scenario, the chamber 1106 and the cavity 1110 can be regarded as one component. In yet another scenario, the cavity 1110 may include an opening configuration for enabling contact with user's body, such as clitoris.

The sexual stimulation device 1100 further includes at least one actuation member 1108. The actuation member 1108 is fluidically coupled to the stimulation elements 1104 through a valve assembly 1114. The actuation member 1108 and the valve assembly 1114 are examples of the second actuation member 504 and the valve assembly 702, 802 respectively. Further, the actuation members 1108 may be operatively coupled to a control circuitry 1112. The control circuitry 1112 is similar to the control circuitry 110. Further, the control circuitry 1112 is configured to operate the actuation member 1108 to regulate the air pressure of the stimulation elements 1104. In one scenario, the actuation member 1108 operates the stimulation elements 1104 in an expanded state (see, 1116 of FIG. 11A) by inflating the chamber 1106. In this scenario, the volume of the cavity 1110 is reduced which will produce a negative pressure effect in the cavity 1110. In another scenario, the actuation member 1108 operates the stimulation elements 1104 in a compressed state (see, 1118 of FIG. 11B) by inhaling (or drawing out) air from within the chamber 1106. As a result, the stimulation 1104 elements are deformed, and the volume of the cavity 1110 increases, which will produce a positive pressure effect in the cavity 1110. Thus, by alternately inflating and deflating the chamber 1106, the volume of the cavity 1110 increases or decreases, thereby forming a stimulation effect of positive and negative pressure at the opening where the cavity 1110 contacts the user's body.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A sexual stimulation device, comprising:

a housing;

at least one linkage member comprising a first end coupled to the housing and a second end disposed freely relative to the housing;

at least one actuation member disposed in the housing;

one or more stimulation elements disposed in the housing, the one or more stimulation elements being operatively coupled to the at least one linkage member; and control circuitry operatively coupled to at least the at least one actuation member and the one or more stimulation elements, the control circuitry being configured to at least activate the one or more stimulation elements to perform predefined actions corresponding to operating parameters appended in a control signal, thereby providing sexual stimulation to the user's body while the sexual stimulation device is in contact with the user's body, wherein the one or more stimulation elements are operatively coupled to the at least one linkage member, wherein the one or more stimulation elements include a first stimulation element, and wherein the first stimulation element, in performing the predefined actions, is configured to activate the at least one linkage member to move in a predefined direction relative to the housing due to polarization of the at least one linkage member.

2. The sexual stimulation device as claimed in claim 1, wherein the first stimulation element comprises an installation structure couplable with a complementary installation structure of the at least one linkage member, and wherein the first stimulation element is electrically coupled with the at least one linkage member via a conductive interface associated with each of the first stimulation element and the at least one linkage member.

3. The sexual stimulation device as claimed in claim 2, wherein the at least one linkage member coupled with the first stimulation element is operatively coupled to a first actuation member of at least one actuation member, and wherein the control circuitry generates a first control signal by appending operating parameters to operate the first actuation member, the operating parameters comprising at least an operating intensity and an operating time, whereby the first actuation member operates the first stimulation element to perform the predefined actions to provide sexual stimulation while the sexual stimulation device is in contact with the user's body.

4. The sexual stimulation device as claimed in claim 1, further comprising an accommodating element disposed in the housing, wherein the accommodating element comprises:

a top portion configured in an open configuration for receiving insertion of male genitalia therein;

a bottom portion; and a recessed area provided along at least a length of an outer wall of the accommodating element, the recessed area being adapted to receive at least a portion of the first stimulation element, and wherein the first stimulation element is operable to perform the predefined actions to provide sexual stimulation to the male genitalia when inserted in the accommodating element, thus providing sexual stimulation to the male genitalia against the accommodating element.

5. The sexual stimulation device as claimed in claim 4, wherein the housing comprises a cut-out portion, and wherein the one or more stimulation elements are disposed in the cut-out portion, whereby the one or more stimulation elements are positioned proximate to the accommodating element and the user's body while the sexual stimulation device is in contact with the user's body.

6. The sexual stimulation device as claimed in claim 1, wherein the one or more stimulation elements and the at least one linkage member form a unitary structure.

7. The sexual stimulation device as claimed in claim 1, wherein the one or more stimulation elements further include a second stimulation element, and wherein the second stimulation element encompasses at least a portion of an accommodating element of the sexual stimulation device.

8. The sexual stimulation device as claimed in claim 7, wherein the second stimulation element is coupled to a second actuation member of at least one actuation member of the sexual stimulation device, wherein the control circuitry generates a second control signal by appending operating parameters to operate the second actuation member, the operating parameters comprising at least an operating pressure, an operating frequency, and an operating time, and wherein the second actuation member operates the second stimulation element between a compressed state and an expanded state to cause the accommodating element to provide sexual stimulation to the male genitalia when inserted therein.

9. The sexual stimulation device as claimed in claim 8, wherein the second stimulation element is disposed in the housing and encompasses at least a portion of the first stimulation element, wherein the second stimulation element in operating between the expanded state and the compressed state activates the first stimulation element, and wherein a combined operation of the second stimulation element and the first stimulation element operates the accommodating element for providing sexual stimulation.

10. The sexual stimulation device as claimed in claim 8, wherein the second actuation member operates the second stimulation element in the expanded state by blowing out air from the ambient atmosphere within the second stimulation element based on the operating pressure, and wherein the second actuation member operates the second stimulation element in the compressed state by expelling air from within the second stimulation element.

11. The sexual stimulation device as claimed in claim 1, wherein the one or more stimulation elements further include a second stimulation element, wherein the first stimulation element is configured to provide a vibrotactile output, and wherein the second stimulation element is configured to undergo elastic deformation to provide a squeezing action.

12. The sexual stimulation device as claimed in claim 1, further comprising a power source operatively coupled to the control circuitry, the one or more stimulation elements, and the at least one actuation member, the power source being configured to provide one of an alternating current output and a direct current output to the control circuitry, the one or more stimulation elements, and the at least one actuation member for operating the sexual stimulation device.

13. The sexual stimulation device as claimed in claim 1, further comprising a flexible element adapted to be selectively removably securable to the housing, the sexual stimulation device being insertable into the user's body and the one or more stimulation elements being adapted to provide sexual stimulation to the user's body against the flexible element.

* * * * *